(12) United States Patent
Watanabe et al.

(10) Patent No.: US 12,096,104 B2
(45) Date of Patent: Sep. 17, 2024

(54) TRANSPARENT MEMBER AND IMAGE PICKUP APPARATUS, AND METHOD OF MANUFACTURING TRANSPARENT MEMBER

(71) Applicant: CANON KABUSHIKI KAISHA, Tokyo (JP)

(72) Inventors: Yo Watanabe, Tokyo (JP); Tomonari Nakayama, Tokyo (JP); Junji Kawasaki, Yokohama (JP); Miwa Takachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 817 days.

(21) Appl. No.: 16/700,042

(22) Filed: Dec. 2, 2019

(65) Prior Publication Data

US 2020/0186685 A1    Jun. 11, 2020

(30) Foreign Application Priority Data

Dec. 7, 2018  (JP) ................................ 2018-230318
Nov. 1, 2019  (JP) ................................ 2019-199987

(51) Int. Cl.
*H04N 23/54* (2023.01)
*C08J 7/02* (2006.01)
(Continued)

(52) U.S. Cl.
CPC ................ *H04N 23/54* (2023.01); *C08J 7/02* (2013.01); *C08J 7/054* (2020.01); *C08J 7/06* (2013.01);
(Continued)

(58) Field of Classification Search
None
See application file for complete search history.

(56) References Cited

U.S. PATENT DOCUMENTS

| 10,234,600 B2 | 3/2019 | Makino et al. |
| 10,459,123 B2 | 10/2019 | Makino et al. |

(Continued)

FOREIGN PATENT DOCUMENTS

| CN | 105700046 A | 6/2016 |
| CN | 106526715 A | 3/2017 |

(Continued)

OTHER PUBLICATIONS

JP2007-025077 English machine translation (2007).*

(Continued)

*Primary Examiner* — Kenneth J Stachel
(74) *Attorney, Agent, or Firm* — Venable LLP (57) ABSTRACT

Provided is a transparent member having formed thereon a film having high reliability, the film being capable of suppressing an increase in its haze and maintaining its hydrophilicity for a long time period even when exposed to an outdoor environment. The transparent member is a transparent member including a resin base material and a porous layer arranged thereon, wherein the porous layer has a network structure in which silica particles are joined to each other with a binder, wherein the resin base material has a mixed layer that the network structure has entered, wherein the mixed layer has a thickness of 20 nm or more and 160 nm or less, and wherein a thickness variation in a range having a length of 1 µm of a section of the mixed layer in its thickness direction along the surface of the resin base material is 15% or less.

18 Claims, 4 Drawing Sheets

(51) Int. Cl.
    *C08J 7/054*     (2020.01)
    *C08J 7/06*     (2006.01)
    *C09D 1/00*     (2006.01)
    *G02B 1/14*     (2015.01)
    *G02B 1/18*     (2015.01)
    *G03B 11/04*     (2021.01)
    *H04N 23/51*     (2023.01)
    *H04N 23/55*     (2023.01)

(52) U.S. Cl.
    CPC ................. *C09D 1/00* (2013.01); *G02B 1/14* (2015.01); *G02B 1/18* (2015.01); *G03B 11/043* (2013.01); *H04N 23/51* (2023.01); *C08J 2369/00* (2013.01); *G03B 2217/002* (2013.01); *H04N 23/55* (2023.01)

(56) References Cited

U.S. PATENT DOCUMENTS

| | | | |
|---|---|---|---|
| 10,564,321 | B2 | 2/2020 | Nakayama et al. |
| 10,738,197 | B2 | 8/2020 | Nakayama et al. |
| 2016/0170094 | A1* | 6/2016 | Nakayama ............... G02B 1/11 428/149 |
| 2017/0269264 | A1 | 9/2017 | Makino et al. |
| 2019/0187335 | A1 | 6/2019 | Nakayama |
| 2020/0308415 | A1 | 10/2020 | Yamamoto et al. |

FOREIGN PATENT DOCUMENTS

| | | | |
|---|---|---|---|
| CN | 108572404 | A | 9/2018 |
| EP | 3 373 048 | A1 | 9/2018 |
| JP | 2004258267 | A * | 9/2004 |
| JP | 2005-181940 | A | 7/2005 |
| JP | 2007-25329 | A | 2/2007 |
| JP | 2007025077 | A * | 2/2007 |
| JP | 2013-203774 | A | 10/2013 |
| JP | 2017-66209 | A | 4/2017 |
| JP | 2018-116177 | A | 7/2018 |
| WO | 2006/049008 | A1 | 5/2006 |
| WO | 2006/057119 | A1 | 6/2006 |

OTHER PUBLICATIONS

JP2004258267EnglishMachineTranslation (2004).*
JP2017-066209AEnglish MachineTranslation (2017).*
"Horiba Scientific, A Guidebook to Particle Size Analysis", pp. 1-32 (2012) (XP055060732); retrieved Apr. 23, 2013 from: URL: http://www.horiba.com/fileadmin/uploads/Scientific/eMag/PSA/Guidebook/pdf/PSA_Guidebook.pdf.
Extended European Search Report in European Application No. 19213486.4 (Apr. 2020).
First Office Action in Chinese Application No. 201911218359.5 (May 22022).
Decision of Refusal in Japanese Application No. 2019-199987 (Sep. 2023).
Notice of Reasons for Refusal in Japanese Application No. 2019-199987 (Jun. 2023).
First Office Action in Chinese Application No. 202310154817.3 (Oct. 2023).
Extended European Search Report in European Application No. 23211421.5 (dated Apr. 2024).

* cited by examiner

TRANSPARENT MEMBER AND IMAGE PICKUP APPARATUS, AND METHOD OF MANUFACTURING TRANSPARENT MEMBER

BACKGROUND OF THE INVENTION

Field of the Invention

The present disclosure relates to a hydrophilic transparent member and a method of manufacturing the member, and an image pickup apparatus using a transparent member in a protection cover.

Description of the Related Art

In recent years, monitoring cameras have been placed in various places, such as a shop, a hotel, a bank, and a station, for preventing crimes. Each of the monitoring cameras is placed by, for example, the following method. The camera is attached to a ceiling, an exterior wall, a prop, or the like through a placing part, or is embedded therein.

A transparent protection cover that does not inhibit image pickup is attached to the main body of any such monitoring camera for protecting the camera from a surrounding environment. A resin material excellent in transparency and impact resistance, such as a polycarbonate or an acrylic resin, is used in the protection cover. In the case of a monitoring camera to be placed outdoors, a water droplet caused by rain, dew condensation, or the like adheres to its protection cover to make a video distorted or unclear. Accordingly, a technology involving arranging a hydrophilic film on the protection cover to prevent the adhesion of the water droplet has been widely used.

In Japanese Patent Application Laid-Open No. 2013-203774, there is a proposal of a hydrophilic film in which a silica sol is caused to enter a resin base material to provide a silica particle film having high hydrophilicity and a high adhesive force.

In general, when a resin base material, such as a polycarbonate or an acrylic resin, to be used in the protection cover of a monitoring camera or the like is placed outdoors for a long time period, the base material is deteriorated by sunlight, and hence a crack, such as a fissure, occurs. Accordingly, even when a hydrophilic film is formed on the protection cover, there is a problem in that a crack also occurs in the hydrophilic film along with the occurrence of a crack in the resin base material that is the protection cover, and hence an image to be taken is disordered by an increase in haze. In addition, when the crack extends, there is a problem in that the hydrophilic film falls from the protection cover, and hence its hydrophilicity cannot be maintained.

Therefore, the hydrophilic film to be arranged on the protection cover preferably has the following feature: when the film is placed outdoors for a long time period, the film can suppress the occurrence of a crack, and hence can maintain its haze and hydrophilicity. However, the hydrophilic film having a configuration proposed in Japanese Patent Application Laid-Open No. 2013-203774 cannot suppress the deterioration of its base material by sunlight when placed outdoors for a long time period. Accordingly, the occurrence of a crack in the hydrophilic film cannot be suppressed, and hence its haze and hydrophilicity cannot be maintained over a long time period.

SUMMARY OF THE INVENTION

The present disclosure has been made in view of the above-mentioned problems, and provides a transparent member including a hydrophilic film, the member having the following feature: when the member is placed outdoors for a long time period, the member can suppress the occurrence of a crack in the hydrophilic film, and hence can suppress an increase in haze and maintain and hydrophilicity of the film.

According to one aspect of the present disclosure, there is provided a transparent member including: a resin base material; and a porous layer arranged on the resin base material, wherein the porous layer has a network structure in which silica particles are joined to each other with a binder, wherein the resin base material has a mixed layer in which the network structure has entered a surface layer of the resin base material on a side on which the porous layer is arranged, wherein the mixed layer has a thickness of 20 nm or more and 160 nm or less, and wherein a thickness variation in a range having a length of 1 μm of a section of the mixed layer in a thickness direction thereof along a surface of the resin base material is 15% or less.

In addition, according to one aspect of the present disclosure, there is provided an image pickup apparatus including: a housing; the transparent member; an optical system; and an image sensor configured to acquire a video through the optical system, the optical system and the image sensor being arranged in a space surrounded by the housing and the transparent member.

In addition, according to one aspect of the present disclosure, there is provided a method of manufacturing a transparent member in which a layer containing silica is formed on a resin base material, the method including applying a dispersion liquid containing silica particles and a component serving as a binder onto the resin base material, followed by curing of the dispersion liquid to form a porous layer, and a mixed layer in which a network structure in which the silica particles are joined to each other with the binder has entered the resin base material, wherein the mixed layer has a thickness of 20 nm or more and 160 nm or less, and wherein a thickness variation in a range having a length of 1 μm of a section of the mixed layer in a direction intersecting with a surface of the resin base material along the surface is 15% or less.

According to one aspect of the present disclosure, the transparent member having formed thereon a hydrophilic film having high reliability, the film being capable of suppression an increase in its haze and maintaining its hydrophilicity for a long time period even when exposed to an outdoor environment, can be provided.

Further features of the present invention will become apparent from the following description of exemplary embodiments with reference to the attached drawings.

DESCRIPTION OF THE EMBODIMENTS

Preferred embodiments of the present disclosure are described below in detail with reference to the drawings. The present disclosure is not limited to the embodiments described below, and modifications may be appropriately made without departing from the spirit of the present disclosure.

<<Transparent Member>>

Figure 1:
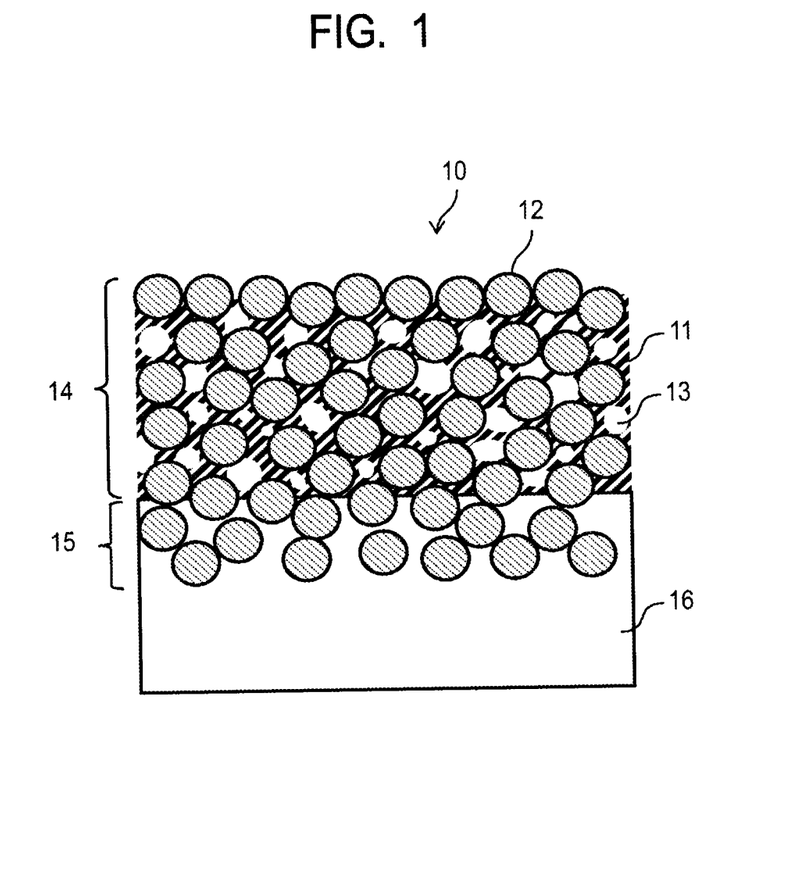
FIG. 1 is a schematic view for illustrating a section of a transparent member according to one aspect of the present disclosure in its thickness direction.

FIG. 1 is a schematic view for illustrating a section of a transparent member according to one aspect of the present disclosure in its thickness direction (direction parallel to the normal of the surface of its base material). In FIG. 1, a transparent member 10 according to one aspect of the present disclosure includes, on a resin base material 16, a hydrophilic film formed of a porous layer 14 and a mixed layer 15 in which the porous layer has entered the resin base material 16. In the present disclosure, the term "transparent" means the following characteristic: a transmittance for visible light is 20% or more.

The porous layer 14 contains a plurality of silica particles (silicon oxide particles) 12 and a binder 11 interposed between the plurality of silica particles 12. The plurality of silica particles 12 are fixed to each other with the binder 11, and voids 13 formed between the silica particles 12 and between some parts of the binder 11 make the layer porous.

When a hydrophilic film formed on a conventional resin base material is placed in an outdoor exposure environment, a stress is applied to the hydrophilic film formed on the resin base material by the following two phenomena to cause a crack:

(1) the surface of the resin base material is oxidatively degraded by sunlight and oxygen; and
(2) the resin base material is expanded or contracted by water absorption due to rain or a temperature change due to sunlight.

In contrast, when such configuration as described above is adopted, first, the resin base material 16 is covered with the mixed layer 15, and hence the surface area of the resin base material 16 exposed to the surface of the transparent member reduces. Accordingly, the oxidative degradation of the resin base material 16 is prevented, and a stress along with the expansion and contraction of the resin base material 16 is alleviated. In addition, the mixed layer 15 and the silica particles of the porous layer 14 have a network structure. Accordingly, a stress along with the oxidative degradation of the resin base material 16 is alleviated, and hence the occurrence of a crack in the resin base material 16 is suppressed. Thus, even when the transparent member according to one aspect of the present disclosure is placed in an outdoor environment, the member can suppress the occurrence of a crack in the hydrophilic film, and hence can suppress an increase in haze and maintain the hydrophilicity of the film for a long time period.

The respective layers are described in detail below.

<Porous Layer>

The porous layer 14 has a network structure in which the silica particles 12 are joined to each other with the binder 11, and the voids 13 are present between the silica particles 12 and in the binder 11. In other words, the network structure is a structure formed by joining the silica particles to each other with the binder. The porosity of the porous layer 14 is preferably 40% or more and 55% or less. When the porosity of the porous layer 14 is 40% or more, the internal stress of the film is moderately maintained. Accordingly, when the film is placed in an outdoor exposure environment, the occurrence of a crack in the film can be suppressed, and hence an increase in its haze can be suppressed and its hydrophilicity can be maintained. In addition, when the porosity of the porous layer 14 is 55% or less, the haze of the hydrophilic film can be reduced, and hence its transparency can be maintained. Further, the binder 11 and the silica particles 12 are hydrophilic. Accordingly, the porous layer 14 has hydrophilicity, and a contact angle for water on the surface of the porous layer 14 is 30° or less. In addition, the thickness of the porous layer 14 is preferably 100 nm or more and 800 nm or less. When the thickness of the porous layer 14 is 100 nm or more, the network structure of the mixed layer 15 and the porous layer 14 can sufficiently suppress the occurrence of a crack in the resin base material 16, and hence can suppress an increase in the haze and maintain the hydrophilicity. In addition, when the thickness of the porous layer 14 is 800 nm or less, an increase in internal stress of the hydrophilic film is suppressed. Accordingly, the occurrence of a crack in the film can be suppressed, and hence an increase in the haze can be suppressed and the hydrophilicity can be maintained.

Herein, the porosity of the porous layer 14 is a value representing the ratio of the volume of the voids in the porous layer 14 to the porous layer 14. The porosity may be calculated from the refractive index of the porous layer measured with a spectroscopic ellipsometer, the refractive index of silica, that is, 1.46, and the refractive index of air, that is, 1.00 by using Equation 1.

$$\text{Porosity} = 100 \times (\text{refractive index of porous layer} - 1.46)/(1.00 - 1.46) \quad \text{(Equation 1)}$$

Further, the average surface roughness Ra of the surface of the porous layer 14, that is, the surface of the transparent member according to one aspect of the present disclosure on the side on which the porous layer 14 is arranged is preferably 2 nm or more and 10 nm or less. The average surface roughness Ra is calculated by a calculation method defined in JIS B 0601:2001, and when the value of the Ra is small, the porous layer 14 has a dense and uniform structure. Accordingly, a case in which the Ra is 10 nm or less is preferred because of the following reason: even when the transparent member according to one aspect of the present disclosure is placed outdoors for a long time period, the oxidative degradation of the base material, and the occurrence of a crack in the hydrophilic film can be suppressed. Meanwhile, the Ra is preferably 2 nm or more in terms of its relationship with the porosity.

[Silica Particles]

The average particle diameter of the silica particles 12 is preferably 10 nm or more and 60 nm or less. When the average particle diameter of the silica particles 12 is 10 nm or more, the sizes of the voids 13 formed between the particles can be moderately increased. Thus, a desired porosity can be achieved, and hence the internal stress of the film can be moderately maintained. Accordingly, when the film is placed in an outdoor exposure environment, the occurrence of a crack in the film can be suppressed, and hence an increase in its haze can be suppressed and its hydrophilicity can be maintained. In addition, a case in which the average particle diameter of the silica particles 12 is 60 nm or less is preferred because of the following reason: the sizes of the voids 13 formed between the particles can be moderately reduced, and hence an increase in haze can be suppressed without the occurrence of the scattering of light by the voids 13 and the silica particles 12.

Herein, the average particle diameter of the silica particles 12 is an average Feret diameter. The average Feret diameter may be measured by the image processing of an image obtained through the observation of the particles with a transmission electron microscope. Commercial image processing software, such as image Pro PLUS (manufactured by Media Cybernetics, Inc.), may be used as an image processing method. In a predetermined image region, contrast adjustment is appropriately performed as required, and the average Feret diameter of the respective particles is measured with commercial particle diameter-measuring software. Thus, the average may be determined.

Although solid silica particles or hollow silica particles may be used as the silica particles 12, chain silica particles in which such particles are linked to each other are particularly preferred. The use of the chain silica particles can increase the porosity of the porous layer without the occurrence of any large void. Particles obtained by mixing the chain silica particles with solid silica particles or hollow silica particles may be used. In the case of the chain silica particles, the average particle diameter of the individual particles linked to each other is preferably 10 nm or more and 60 nm or less.

The silica particles 12 each contain $SiO_2$ as a main component. In addition to the component, a metal oxide, such as $Al_2O_3$, $TiO_2$, $ZnO_2$, or $ZrO_2$, may be incorporated into each of the particles. However, when 30% or more of silanol (Si—OH) groups on the surfaces of the silica particles 12 are modified with an organic group or the like, or are composited with any other metal, the hydrophilicity of the porous layer is lost. The porous layer 14 formed of such silica particles has low hydrophilicity, and is reduced in self-cleaning property.

Therefore, in order that the porous layer 14 may be caused to express satisfactory hydrophilicity, such silica particles that silanol (Si—OH) groups remain on 70% or more of the surfaces of the particles are preferably used, and such silica particles that 90% or more of silanol groups on the surfaces of the particles remain are more preferably used.

[Binder]

The binder 11 may be appropriately selected in terms of the abrasion resistance and environmental reliability of the hydrophilic film, and its adhesive force with the silica particles 12; a silica binder that has a high affinity for the silica particles 12 and improves the abrasion resistance of the porous layer is preferably used. Of such silica ($SiO_2$) binders, a hydrolytic condensate of a silicate is more preferably used, and a hydrolytic condensate of a tetrafunctional silicate is still more preferably used.

The content of the binder 11 is preferably 3 mass % or more and 20 mass % or less, more preferably 10 mass % or more and 20 mass % or less with respect to the entire mass of the porous layer 14. When the content of the binder 11 with respect to the entire mass of the porous layer 14 is less than 3 mass %, there is a risk in that its force for fixing the silica particles 12 is weak, and hence the silica particles 12 peel off. In addition, when the content of the binder 11 with respect to the entire mass of the porous layer 14 is more than 20 mass %, the following tendency is observed: spaces between the silica particles 12 are filled with the binder to reduce the porosity in the porous layer 14, and hence the internal stress of the hydrophilic film increases.

<Mixed Layer>

The mixed layer 15 is a layer in which the resin base material 16 has entered the voids of the network structure formed by joining the silica particles to each other with the binder, and is arranged on the side of the resin base material 16 on which the porous layer 14 is arranged. The range of from the uppermost portion of the resin base material 16 that has entered the voids of the network structure formed by the binder and the silica particles to the lowermost portion of the network structure is the mixed layer 15. The resin base material 16 may be oxidatively degraded by sunlight and oxygen when placed in an outdoor environment. However, the mixed layer can reduce the surface area of the resin base material 16 in contact with oxygen, and hence can suppress the oxidative degradation of the resin base material 16. Further, when the mixed layer 15 and the porous layer 14 have a continuous network structure, a stress along with the oxidative degradation of the resin base material 16 is alleviated, and hence the occurrence of a crack in the resin base material is suppressed.

The thickness of the mixed layer 15 is preferably 20 nm or more and 160 nm or less. When the thickness of the mixed layer 15 is less than 20 nm, the resin base material 16 does not sufficiently enter the network structure. Accordingly, a stress along with the oxidative degradation of the resin base material 16 cannot be alleviated, and hence the occurrence of a crack in the resin base material 16 cannot be suppressed. In addition, a case in which the thickness of the mixer layer 15 is more than 160 nm is not preferred because the scattering of light by the resin base material 16 and the silica particles 12 occurs to increase the haze of the hydrophilic film. In addition, the thickness of the mixed layer is preferably larger than the average particle diameter of the silica particles. When the thickness of the mixed layer is larger than the average particle diameter of the silica particles, the strength of the network structure of the mixed layer 15 can be improved, and hence the occurrence of a crack can be suppressed with more reliability. When chain silica particles are used, the thickness of the mixed layer is preferably larger than the average particle diameter of individual particles linked to each other.

In addition, the volume ratio of the network structure in the mixed layer 15 is preferably 20% or more and 80% or less, more preferably 30% or more and 70% or less. When the volume ratio of the network structure in the mixed layer 15 is 20% or more, the oxidative degradation of the resin base material 16 at the time of its exposure outdoors can be sufficiently suppressed, and hence the occurrence of a crack therein can be suppressed. When the volume ratio of the network structure in the mixed layer 15 is 80% or less, a stress at the time of the exposure outdoors can be alleviated, and hence the occurrence of a crack can be suppressed.

In addition, the mixed layer 15 alleviates a stress along with the expansion and contraction of the resin base material 16 caused by water absorption due to rain or a temperature change due to sunlight. The thickness of the mixed layer 15 shows a thickness variation of 15% or less in an arbitrary range having a length of 1 μm in a section in its thickness direction along the surface of the resin base material 16. When the thickness variation of the mixed layer in the surface of the film is more than 15%, a stress along with the expansion and contraction of the resin base material concentrates on a portion of the mixed layer having a thickness smaller than that of its surroundings. Thus, a crack occurs in the resin base material 16, and hence a crack occurs in the hydrophilic film. Accordingly, an increase in the haze cannot be suppressed and hydrophilicity of the film cannot be maintained.

Figure 4:
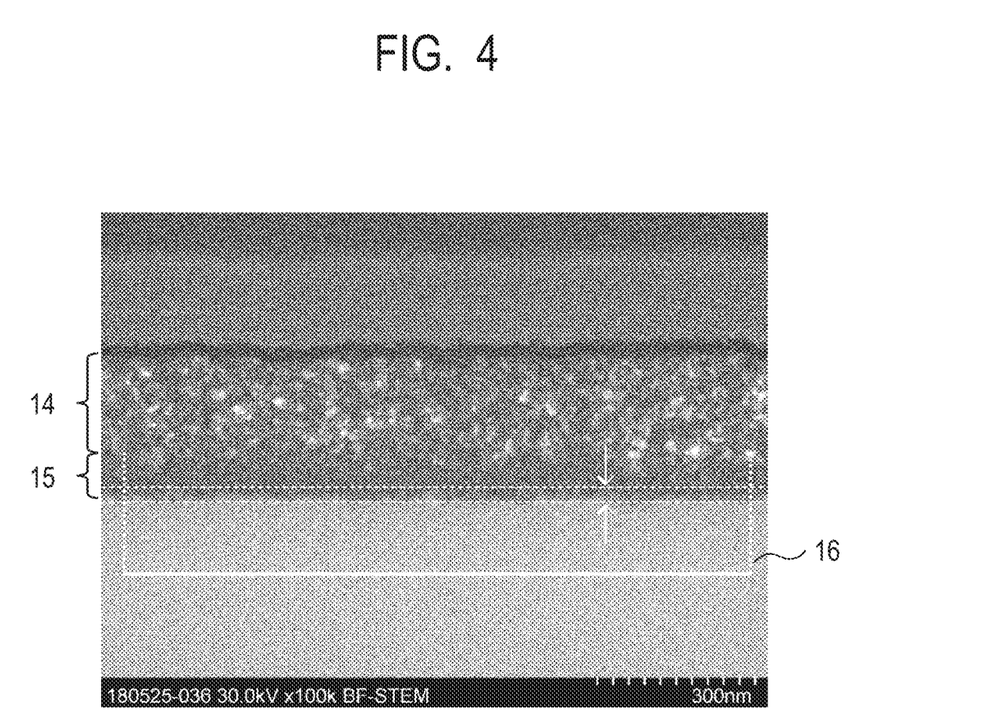
FIG. 4 is an image of a section of a transparent member manufactured in Example 1, which is obtained through observation with a scanning transmission electron microscope.

The thickness variation is the ratio of the height of irregularities occurring at an interface between the resin base material 16 and the mixed layer 15 to the average thickness of the mixed layer 15. The average thickness of the mixed layer 15, and the height of the irregularities occurring at the interface between the resin base material 16 and the mixed layer 15 are determined by: flaking the transparent member according to one aspect of the present disclosure; and observing a section of the resultant flake with a scanning transmission electron microscope or the like. Herein, the height of the irregularities occurring at the interface between the resin base material 16 and the mixed layer 15 is the absolute value of a difference in height in the thickness direction between a portion formed only of the resin base material 16, which is present closest to the mixed layer side at the interface, and the portion of the mixed layer 15 present closest to the resin base material 16 side. When the thickness variation is calculated, an image obtained through the observation is preferably binarized with image processing software because it becomes easier to discriminate between the base material and the mixed layer (the silica particles or the binder). As shown in FIG. 4, when an arbitrary range having a length of 1 μm in a section in the thickness direction along the surface of the resin base material 16 is defined as a range represented by a solid line in FIG. 4, the height of the irregularities (the thickness variation) occurring at the interface between the resin base material 16 and the mixed layer 15 corresponds to a ratio of the height of the irregularities in respect to the average of a distance between two white broken lines (distance represented by white arrows).

<Resin Base Material 16>

A resin such as a transparent acrylic resin, a polycarbonate, or a polyester may be used as a material for the resin base material 16. The shape of the resin base material 16 is not limited, and may be a plate shape or a film shape. In addition, the shape may be a flat plate shape, or may be a shape having a curved surface, a concave surface, or a convex surface, such as a hemispherical dome shape. The transmittance of the resin base material for visible light is preferably 50% or more.

<Manufacturing Method>

Next, an example of a method of manufacturing a transparent member according to one aspect of the present disclosure is described.

The method of manufacturing a transparent member according to one aspect of the present disclosure includes the step of forming the porous layer 14 and the mixed layer 15 on the resin base material 16.

A method involving sequentially applying a dispersion liquid of the silica particles 12 and a binder solution onto the resin base material 16, followed by drying, or a method involving applying a dispersion liquid containing both of the silica particles 12 and a component serving as the binder 11 onto the resin base material 16, followed by drying may be used as the step of forming the porous layer 14 and the mixed layer 15. The method involving applying the dispersion liquid containing both of the silica particles 12 and the component serving as the binder 11 is more preferred because composition in the porous layer 14 becomes uniform.

The dispersion liquid of the silica particles 12 is a liquid obtained by dispersing the silica particles 12 in a solvent, and the content of the silica particles 12 is preferably 2 mass % or more and 10 mass % or less. A silane coupling agent or a surfactant may be added to the dispersion liquid of the silica particles 12 for improving the dispersibility of the silica particles 12. However, when any such compound reacts with many of the silanol groups on the surfaces of the silica particles 12, bonding between the silica particles 12 and the binder 11 weakens to reduce the abrasion resistance of the porous layer 14 or to reduce the hydrophilicity of the porous layer 14. Accordingly, the content of the additive such as a silane coupling agent or a surfactant in the dispersion liquid is preferably 10 parts by mass or less, more preferably 5 parts by mass or less with respect to 100 parts by mass of the silica particles 12.

A solution of a silica binder having a strong bonding force with the silica particles 12 is preferably used as the binder solution. The silica binder solution is preferably a solution containing, as a main component, a silicate hydrolytic condensate produced by adding water and an acid or a base to a silicic acid ester, such as methyl silicate or ethyl silicate, in a solvent to subject the silicic acid ester to hydrolytic condensation.

It is desired that what kind of acid or base is used be appropriately selected in consideration of its solubility in the solvent and its reactivity with the silicic acid ester. The acid to be used in the hydrolysis reaction is preferably hydrochloric acid or nitric acid, and the base is preferably ammonia or any one of various amines. The silicate hydrolytic condensate may be prepared not only by using the silicic acid ester but also by neutralizing and condensing a silicate such as sodium silicate in water. An acid that may be used in the neutralization reaction is, for example, hydrochloric acid or nitric acid. When the silica binder solution is prepared, its materials may be heated at a temperature of 80° C. or less.

When the silica binder is used as the binder 11, a trifunctional silane alkoxide substituted with an organic group, such as methyltriethoxysilane or ethyltriethoxysilane, may be added to the silica binder solution for improving the solubility of the silica binder and the applicability of the solution. The addition amount of the trifunctional silane alkoxide is preferably 10 mol % or less of the entirety of the silane alkoxides in the silica binder solution. When the addition amount is more than 10 mol %, the organic group inhibits hydrogen bonding between silanol groups in the binder, and hence the abrasion resistance of the porous layer reduces.

When the dispersion liquid containing both of the silica particles 12 and the component serving as the binder 11 is used, the dispersion liquid of the silica particles 12 and the binder solution described in the foregoing may each be prepared in advance before being mixed with each other. Alternatively, the dispersion liquid may be prepared by adding the component serving as the binder 11 to the dispersion liquid of the silica particles 12 and causing the component to react with the particles. When a dispersion liquid containing the silica particles 12 and the silica binder, which is the component serving as the binder 11, is obtained by using the latter method, the dispersion liquid may be prepared by adding a silicic acid ester, water, and an acid catalyst to the dispersion liquid of the silica particles 12, and causing the silicic acid ester and water to react with the particles. The method involving preparing the binder solution in advance and then mixing the solution with the dispersion liquid of the silica particles is preferred because the reaction of the component serving as the binder 11 can be controlled and the target dispersion liquid can be prepared while the state of the reaction is observed.

The amount of the component serving as the binder 11 in the dispersion liquid containing both of the silica particles 12 and the component serving as the binder 11 is preferably 3 parts by mass or more and 20 parts by mass or less, more preferably 10 parts by mass or more and 20 parts by mass or less with respect to 100 parts by mass of the silica particles and the component serving as the binder.

The solvent that may be used in the dispersion liquid of the silica particles 12 or the silica binder solution needs to enable the particles or the binder to be uniformly dissolved or dispersed therein, and to enable the formation of a film in which the thickness of the mixed layer 15 is uniform. Accordingly, a solvent having relatively high solubility for the resin base material 16 and a solvent having relatively low solubility therefor are desirably combined. In addition, the boiling point of the solvent having relatively high solubility for the resin base material 16 is desirably higher than the boiling point of the solvent having relatively low solubility for the resin base material 16. When the solvents are selected as described above, in the early stage of a film formation process, uniform array of the silica particles is promoted, and hence a porous network structure that is uniform and has a high array property is formed. In the later stage of the film formation process, the ratio of the solvent having relatively high solubility, which has a high boiling point, increases, and hence the resin base material 16 is abruptly dissolved. Accordingly, the porous network structure formed in the early stage of the film formation process enters the resin base material 16, and hence the mixed layer 15 that is uniform is formed.

Examples of the solvent having relatively high solubility for the resin base material 16 include: ethers, such as dimethoxyethane, diglyme, dioxane, diisopropyl ether, dibutyl ether, and cyclopentyl methyl ether; esters, such as ethyl acetate, n-butyl acetate, ethylene glycol monomethyl ether acetate, ethylene glycol monoethyl ether acetate, ethylene glycol monobutyl ether acetate, and propylene glycol monomethyl ether acetate; various aliphatic or alicyclic hydrocarbons, such as n-hexane, n-octane, cyclohexane, cyclopentane, and cyclooctane; various aromatic hydrocarbons, such as toluene, xylene, and ethylbenzene; various ketones, such as acetone, methyl ethyl ketone, methyl isobutyl ketone, cyclopentanone, 2-heptanone, and cyclohexanone; various chlorinated hydrocarbons, such as chloroform, methylene chloride, carbon tetrachloride, and tetrachloroethane; and aprotic polar solvents, such as N-methylpyrrolidone, N,N-dimethylformamide, N,N-dimethylacetamide, and ethylene carbonate. Of those, diglyme, dibutyl ether, propylene glycol monomethyl ether acetate, and 2-heptanone are each preferably used as the solvent having relatively high solubility for the resin base material 16.

In addition, examples of the solvent having relatively low solubility for the resin base material 16 include: monohydric alcohols, such as methanol, ethanol, 1-propanol, 2-propanol, 1-butanol, 2-butanol, 2-methylpropanol, 1-pentanol, 2-pentanol, cyclopentanol, 2-methylbutanol, 3-methylbutanol, 1-hexanol, 2-hexanol, 3-hexanol, 4-methyl-2-pentanol, 2-methyl-1-pentanol, 2-ethylbutanol, 2,4-dimethyl-3-pentanol, 3-ethylbutanol, 1-heptanol, 2-heptanol, 1-octanol, and 2-octanol; dihydric or higher alcohols, such as ethylene glycol and triethylene glycol; and ether alcohols, such as methoxyethanol, ethoxyethanol, propoxyethanol, isopropoxyethanol, butoxyethanol, 1-methoxy-2-propanol, 1-ethoxy-2-propanol, and 1-propoxy-2-propanol. Of those, 2-propanol is preferably used as the solvent having relatively low solubility for the resin base material 16.

To obtain the transparent member according to one aspect of the present disclosure, the solvent having relatively high solubility for the resin base material 16 and the solvent having relatively low solubility for the resin base material 16 to be used only need to be selected from, for example, those listed solvents so that their boiling points may differ from each other. In addition, in consideration of the boiling points of the solvents, two or more kinds of solvents selected from each of the group of the solvents each having relatively high solubility and the group of the solvents each having relatively low solubility may be used as a mixture.

When the solvent having relatively high solubility and the solvent having relatively low solubility are used as a mixture, the ratio of the solvent having relatively high solubility is preferably 2 mass % or more and 30 mass % or less, more preferably 10 mass % or more and 20 mass % or less. When the ratio is 2 mass % or more, a sufficiently uniform mixed layer can be formed, and when the ratio is 30 mass % or less, the thickness of the mixed layer is prevented from becoming excessively large, and hence an increase in the haze of the hydrophilic film can be satisfactorily suppressed.

As a method of applying the dispersion liquid of the silica particles 12 and the binder solution, or the dispersion liquid obtained by mixing the dispersion liquid of the silica particles and the solution, there are given a spin coating method, a blade coating method, a roll coating method, a slit coating method, a printing method, a dip coating method, and the like. When a transparent member having a three-dimensionally complicated shape, such as a concave surface, is manufactured, the spin coating method is preferred from the viewpoint of the uniformity of the film thickness.

After the application of the dispersion liquid of the silica particles 12 and the binder solution, or the dispersion liquid obtained by mixing the dispersion liquid of the silica particles and the solution, the abrasion resistance of the porous layer may be improved by suppressing the amount of the solvent remaining in each of the porous layer and the mixed layer. Accordingly, a drying step and a curing step are preferably provided to form the porous layer and the mixed layer. The drying step and the curing step are each a step for accelerating the removal of the solvent, the reaction of the component serving as the binder 11, or a reaction between the component serving as the binder 11 and the silica particles 12. The temperature of each of the drying step and the curing step is preferably 20° C. or more and 200° C. or less, more preferably 60° C. or more and 150° C. or less. When the temperature of each of the drying step and the curing step is less than 20° C., the solvent remains to reduce the abrasion resistance. In addition, when the temperature of each of the drying step and the curing step is more than 200° C., the curing of the binder 11 extremely advances, with the result that breakage is liable to occur in the porous layer 14.

The density of the solvent remaining in the porous layer 14 is preferably 3.0 mg/cm$^3$ or less.

When the dispersion liquid of the silica particles 12 and the binder solution are sequentially applied, the porous layer and the mixed layer may be formed as follows: the dispersion liquid of the silica particles 12 is applied and a firing step is performed once; and then, the binder solution is applied, and the drying step and the curing step are performed.

To set the thickness of the porous layer 14 to a desired value, the applying steps, and the drying step and the curing step described above may be alternately repeated a plurality of times.

<<Image Pickup Apparatus>>

Figure 2A:
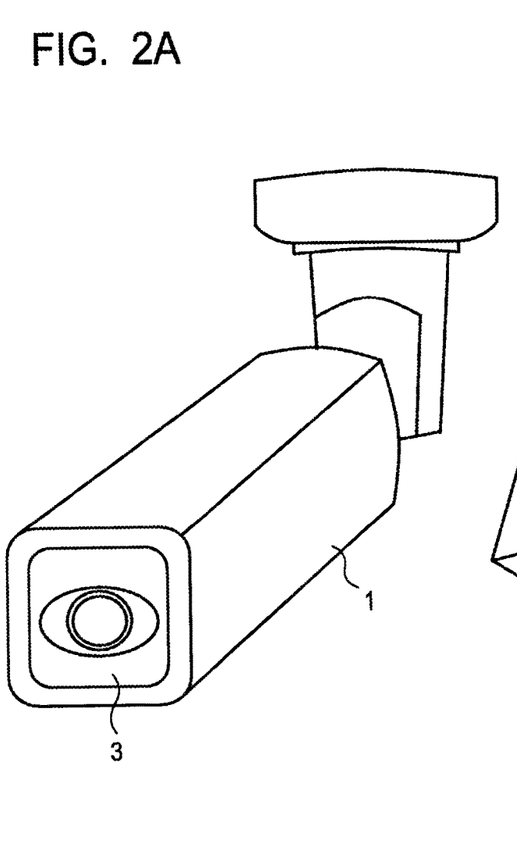
FIG. 2A and FIG. 2B are each a schematic view for illustrating an image pickup apparatus according to one aspect of the present disclosure.
Figure 2B:
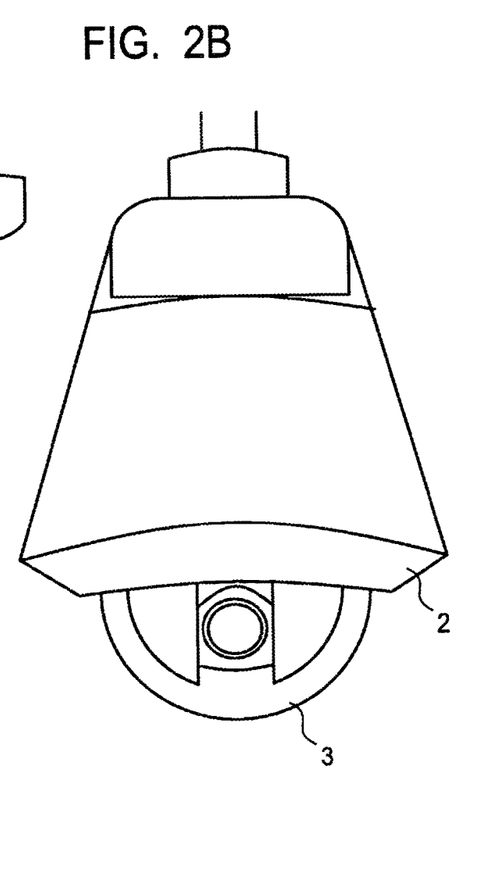

FIG. 2A and FIG. 2B are each a schematic view for illustrating an image pickup apparatus according to one aspect of the present disclosure. FIG. 2A is an illustration of a fixed point observation-type monitoring camera, and FIG. 2B is an illustration of a turnable monitoring camera capable of pan-tilt-zoom driving. The image pickup apparatus illustrated in FIG. 2A and FIG. 2B include, in apparatus main bodies 1 and 2, transparent members (protection covers) 3 according to one aspect of the present disclosure, the members functioning as protection covers, and the apparatus main bodies 1 and 2 include optical systems configured to acquire video data. In addition, the transparent members 3 cover at least the optical systems of the apparatus main bodies 1 and 2 to protect the systems from external dust and impact. Although the protection cover 3 of FIG. 2A is of a planar box shape, and the protection cover 3 of FIG. 2B is of a hemispherical dome shape, the shapes of the protection covers 3 are not limited thereto.

Figure 3:
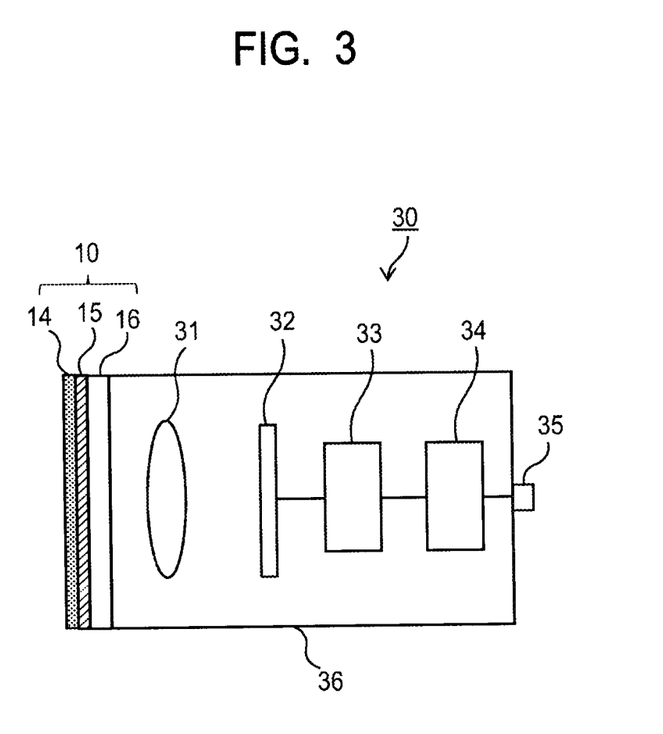
FIG. 3 is a schematic view for illustrating a configuration example of the image pickup apparatus according to one aspect of the present disclosure.

A configuration example of the image pickup apparatus according to one aspect of the present disclosure is illustrated in FIG. 3. An image pickup apparatus 30 includes a space surrounded by the transparent member 10 including the porous layer 14, the mixed layer 15, and the resin base material 16, and a housing 36, and includes, in the space, an optical system 31, an image sensor 32, a video engine 33, a compressed output circuit 34, and an output portion 35.

A video obtained through the transparent member 10 is guided to the image sensor 32 by the optical system (lens) 31, and is converted into a video analog signal (electric signal) by the image sensor 32 to be output. The video analog signal output from the image sensor 32 is converted into a video digital signal by the video engine 33, and the video digital signal output from the video engine 33 is compressed into a digital file by the compressed output circuit 34. The video engine 33 may perform processing of adjusting image quality, such as brightness, contrast, color correction, and noise removal, in a process of converting the video analog signal into the video digital signal. The signal output from the compressed output circuit 34 is output from the output portion 35 to external equipment through wiring.

The transparent member 10 is placed so that its surface on which the porous layer 14 is arranged may be on an outer side. With such configuration, the image pickup apparatus is protected from external dust and impact. In addition, a water droplet adhering to the surface of the transparent member 10 owing to a change in outside environment is turned into a liquid film, and hence the distortion of the video acquired by the image sensor 32 can be suppressed.

Further, the image pickup apparatus 30 may form an image pickup system together with a pan tilt configured to adjust an angle of view, a controller configured to control an image pickup condition and the like, a storage device configured to store acquired video data, a transfer unit configured to transfer data output from the output portion 35 to outside, and the like.

EXAMPLES

A specific method of manufacturing the transparent member according to one aspect of the present disclosure is described below.

(Preparation of Application Liquid)

First, an application liquid to be used in the manufacture of the transparent member according to one aspect of the present disclosure is described.

(1) Preparation of Silica Binder Solution 13.82 Grams of ethanol and an aqueous solution of nitric acid (concentration: 3%) were added to 12.48 g of ethyl silicate, and the mixture was stirred at room temperature for 10 hours to prepare a silica binder solution (solid content concentration: 12.0 mass %).

(2-1) Preparation of Silica Particle Application Liquid A 20.00 Grams of a 2-propanol (IPA) dispersion liquid of chain silica particles (product name: IPA-ST-UP, manufactured by Nissan Chemical Industries, Ltd., solid content concentration: 15.5 mass %) was diluted by using 85.00 g of IPA (boiling point: 82.5° C.) and 15.00 g of diglyme (boiling point: 162.0° C.) as solvents. After that, 2.60 g of the silica binder solution prepared in the section (1) was added to the diluted liquid, and the mixture was stirred at room temperature for 10 minutes. After that, the mixture was stirred at 50° C. for 1 hour to prepare a silica particle application liquid A. Particle size distribution measurement by a dynamic light scattering method (product name of an apparatus used in the measurement: ZETASIZER NANO ZS, manufactured by Malvern Panalytical Ltd.) confirmed that chain silica particles in which silica particles having an average particle diameter of 15 nm were linked to each other so as to have an average circle-equivalent diameter of 95 nm were dispersed in the silica particle application liquid A.

(2-2) Preparation of Silica Particle Application Liquid B

A silica particle application liquid B was prepared in the same manner as in the silica particle application liquid A except that 85.00 g of IPA and 15.00 g of dibutyl ether (boiling point: 140.8° C.) were used as solvents.

(2-3) Preparation of Silica Particle Application Liquid C

A silica particle application liquid C was prepared in the same manner as in the silica particle application liquid A except that 85.00 g of IPA and 15.00 g of propylene glycol monomethyl ether acetate (boiling point: 140.0° C.) were used as solvents.

(2-4) Preparation of Silica Particle Application Liquid D

A silica particle application liquid D was prepared in the same manner as in the silica particle application liquid A except that 70.00 g of IPA and 30.00 g of 2-heptanone (boiling point: 151.0° C.) were used as solvents.

(2-5) Preparation of Silica Particle Application Liquid E

A silica particle application liquid E was prepared in the same manner as in the silica particle application liquid A except that 70.00 g of IPA and 30.00 g of diglyme were used as solvents.

(2-6) Preparation of Silica Particle Application Liquid F

A silica particle application liquid F was prepared in the same manner as in the silica particle application liquid A except that 100.00 g of IPA was used as a solvent.

(2-7) Preparation of Silica Particle Application Liquid G

A silica particle application liquid G was prepared in the same manner as in the silica particle application liquid A except that 70.00 g of IPA and 30.00 g of tetrahydrofuran (boiling point: 66.0° C.) were used as solvents.

(2-8) Preparation of Silica Particle Application Liquid H

A silica particle application liquid H was prepared in the same manner as in the silica particle application liquid A except that 105.00 g of IPA and 30.00 g of diglyme were used as solvents.

Example 1

An appropriate amount of the silica particle application liquid A was dropped onto a polycarbonate base material having a diameter (φ) of 50 mm, a thickness of 4 mm, and a light transmittance of about 80% (nd=1.58, vd=30.2), and spin coating was performed at 2,000 rpm for 20 seconds. After that, the resultant was heated in a circulating hot air oven at 90° C. for 15 minutes. Thus, a transparent member having formed therein a porous layer and a mixed layer was manufactured. The average Feret diameter of the silica particles was 15 nm.

FIG. 4 is an observed image of a section of the transparent member manufactured in Example 1. It is found that three layers, that is, the resin base material 16, the mixed layer 15 of the resin base material and the silica particles, and the porous layer 14 are formed from the bottom of the observed image. The calculation of the thickness variation of the mixed layer 15 to be described later was performed with the observed image of the section, and the thickness variation was 8%.

Example 2

A transparent member was manufactured in the same manner as in Example 1 except that the silica particle application liquid B was used instead of the silica particle application liquid A.

Example 3

A transparent member was manufactured in the same manner as in Example 1 except that the silica particle application liquid C was used instead of the silica particle application liquid A.

Example 4

A transparent member was manufactured in the same manner as in Example 1 except that the silica particle application liquid D was used instead of the silica particle application liquid A.

Example 5

A transparent member was manufactured in the same manner as in Example 1 except that the silica particle application liquid E was used instead of the silica particle application liquid A.

Example 6

A transparent member manufactured in the same manner as in Example 1 was further coated with the silica particle application liquid F. The coating was performed by repeating the following series of steps twice: an appropriate amount of the silica particle application liquid F was dropped onto the transparent member, and spin coating was performed at 2,000 rpm for 20 seconds; and the resultant was heated in a circulating hot air oven at 90° C. for 15 minutes. Thus, a transparent member was manufactured.

Comparative Example 1

A transparent member was manufactured in the same manner as in Example 1 except that the silica particle application liquid F was used instead of the silica particle application liquid A.

Comparative Example 2

A transparent member with a hydrophilic film manufactured in the same manner as in Example 1 was further coated with the silica particle application liquid F. The coating was performed by repeating the following series of steps three times: an appropriate amount of the silica particle application liquid F was dropped onto the transparent member, and spin coating was performed at 2,000 rpm for 20 seconds; and the resultant was heated in a circulating hot air oven at 90° C. for 15 minutes. Thus, a transparent member with a hydrophilic film was manufactured.

Comparative Example 3

A transparent member was manufactured in the same manner as in Example 1 except that the silica particle application liquid G was used instead of the silica particle application liquid A.

Comparative Example 4

A transparent member was manufactured in the same manner as in Example 1 except that the silica particle application liquid H was used instead of the silica particle application liquid A.

(Method of Evaluating Transparent Member)

Next, methods of evaluating the transparent members manufactured in Examples and Comparative Examples are described.

(1) Measurement of Thicknesses of Porous Layer and Mixed Layer

The thicknesses of the porous layer and mixed layer of each of the transparent members were determined through measurement with a spectroscopic ellipsometer (product name: VASE, manufactured by J. A. Woollam Japan) in the wavelength range of from 380 nm to 800 nm.

(2) Measurement of Porosity of Porous Layer

The refractive index of the porous layer of each of the transparent members was determined by analyzing a value obtained through measurement with a spectroscopic ellipsometer (product name: VASE, manufactured by J.A. Woollam Japan) in the wavelength range of from 380 nm to 800 nm, and the porosity of the porous layer was calculated by using Equation 1.

(3) Measurement of Thickness Variation of Mixed Layer

A film was cut out of each of the transparent members with a focused ion beam apparatus (product name: SMI-3050, manufactured by SII NanoTechnology Inc.), and was flaked so that a section of the mixed layer of the transparent member in its thickness direction could be observed. The state of the section of the mixed layer in the thickness direction was subjected to bright field observation with a scanning transmission electron microscope (product name: S-5500, manufactured by Hitachi High-Technologies Corporation) in a field of view at a magnification of 100,000. After that, the observed image was subjected to image processing. Commercial image processing software, such as image Pro PLUS (manufactured by Media Cybernetics, Inc.), was used as an image processing method. In a predetermined image region, contrast adjustment was appropriately performed as required, and the thickness of the mixed layer was calculated, followed by the calculation of its thickness variation in a range having a length of 1 μm.

(4) Measurement of Contact Angle

A contact angle at a time of contact of a liquid droplet of 2 μl of pure water at a temperature of 23° C. and a humidity of 50% RH was measured with a full automatic contact angle meter (product name: DM-701, manufactured by Kyowa Interface Science Co., Ltd.).

(5) Measurement of Haze

The haze of each of the transparent members was measured with a haze meter (product name: NDH 2000, manufactured by Nippon Denshoku Industries Co., Ltd.).

(6) Outdoor Exposure Test

Each of the transparent members was loaded into a xenon weather meter (product name: SUPER XENON WEATHER METER SX75, manufactured by Suga Test Instruments Co., Ltd.). A light irradiation intensity was set to 180 W/m$^2$, and the following procedure was defined as 1 cycle: light irradiation and water discharge were performed for 18 minutes; and only light irradiation was performed for 1 hour and 42 minutes. The transparent member was tested and evaluated by repeating the cycle a total of 300 times, i.e., for a total of 600 hours. The contact angle of the transparent member after the test was measured in the same manner as in the section "(4) Measurement of Contact Angle". 100 Hours of the outdoor exposure test corresponds to 1 year of actual outdoor exposure.

(7) Evaluation

When the contact angle of a transparent member is 30° or less, the formation of a water droplet on the surface of the transparent member can be sufficiently suppressed. In addition, when the haze thereof is 1 or less, a clear image can be acquired at the time of photographing. Therefore, a case in which the initial value of the contact angle and the value thereof after the outdoor exposure test were each 30° or less, and the initial value of the haze and the value thereof after the test were each 1 or less was evaluated as being satisfactory, and a case in which any one of the initial value of the contact angle and the value thereof after the test was more than 30°, or any one of the initial value of the haze and the value thereof after the test was more than 1 was evaluated as being unsatisfactory.

(8) Measurement of Surface Roughness

The surface shape of each of the transparent members in a range measuring 2 μm by 2 μm was measured with a SPM (product name: L-trace & NanoNavi II, manufactured by SII NanoTechnology Inc.), and the Ra thereof was calculated from the measured value.

The measurement results and evaluation results of Examples 1 to 6 and Comparative Examples 1 to 4 are shown in Table 1.

larger than the range specified in the present disclosure and Comparative Example 4 in which the thickness of the porous layer was smaller than the range specified in the present disclosure, and Comparative Example 3 in which the thickness variation of the mixed layer was larger than the range specified in the present disclosure, the hydrophilicity could not be maintained and an increase in the haze could not be suppressed after the outdoor exposure.

The transparent member according to one aspect of the present disclosure is not limited to image pickup apparatus applications, such as a planar cover and a dome cover for an outdoor camera and a monitoring camera, and can be utilized in optical components, such as an optical lens, an optical mirror, an optical filter, and an eyepiece of an image pickup system and a projection system, as well as general applications, such as a windowpane, a mirror, a lens, and a transparent film.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-230318, filed Dec. 7, 2018, and Japanese Patent Application No. 2019-199987, filed Nov. 1, 2019, which are hereby incorporated by reference herein in their entirety.

What is claimed is:
1. A member comprising:
a resin base material consisting of a resin;

TABLE 1

| | Porous layer Thickness (nm) | Mixed layer Thickness (nm) | Mixed layer Thickness variation (%) | Surface roughness | Initial stage Contact angle (°) | Haze | After outdoor exposure test Contact angle (°) | Haze | Evaluation result |
|---|---|---|---|---|---|---|---|---|---|
| Example 1 | 157 | 84 | 8 | 2.6 | 9 | 0.2 | 14 | 0.2 | Satisfactory |
| Example 2 | 292 | 76 | 14 | 8.5 | 11 | 0.1 | 11 | 0.8 | Satisfactory |
| Example 3 | 266 | 20 | 7 | 2.4 | 12 | 0.3 | 13 | 0.5 | Satisfactory |
| Example 4 | 211 | 53 | 10 | 3.4 | 10 | 0.2 | 12 | 0.3 | Satisfactory |
| Example 5 | 122 | 158 | 12 | 3.8 | 10 | 0.2 | 21 | 0.4 | Satisfactory |
| Example 6 | 800 | 95 | 8 | 2.2 | 9 | 0.3 | 13 | 0.9 | Satisfactory |
| Comparative Example 1 | 280 | 0 | — | 2.4 | 10 | 0.4 | 35 | 1.5 | Unsatisfactory |
| Comparative Example 2 | 1,030 | 99 | 8 | 2.5 | 10 | 0.2 | 14 | 3.2 | Unsatisfactory |
| Comparative Example 3 | 200 | 20 | 70 | 15.2 | 11 | 0.7 | 70 | 5.7 | Unsatisfactory |
| Comparative Example 4 | 11 | 70 | 7 | 4.4 | 9 | 0.3 | 32 | 1.1 | Unsatisfactory |

As shown in Table 1, it was confirmed that, with the configuration of each of Examples, the initial value of the contact angle and the value thereof after the outdoor exposure were each 30° or less, and the initial value of the haze and the value thereof after the exposure were each 1 or less, and hence it was confirmed that the hydrophilicity of each of the transparent members were able to be maintained and an increase in the haze of each of the transparent members were able to be suppressed. Meanwhile, in each of Comparative Example 1 deviating from the scope of the present disclosure owing to the absence of any mixed layer, Comparative Example 2 in which the thickness of the porous layer was a mixed layer on the resin base material, the mixed layer comprising the resin and a portion of a plurality of silica particles; and
a porous layer on the mixed layer, the porous layer having voids and comprising a binder and another portion of a plurality of silica particles joined to each other by the binder,
wherein a thickness of the mixed layer is larger than an average Feret diameter of the plurality of the silica particles in the mixed layer.

2. The member according to claim 1, wherein the average Feret diameter of the plurality of the silica particles in the mixed layer is 10 nm to 60 nm.

3. The member according to claim 1, wherein the binder is a silica binder.

4. The member according to claim 1, wherein a thickness of the porous layer is 100 nm to 800 nm.

5. The member according to claim 1, wherein the resin is selected from the group consisting of an acrylic resin, a polycarbonate, and a polyester.

6. The member according to claim 1, wherein the thickness of the mixed layer is 20 nm to 160 nm.

7. The member according to claim 1, wherein a thickness variation of the mixed layer in a range having a length of 1 μm of a section of the mixed layer along an interface between the resin base material and the mixed layer is 15% or less.

8. The member according to claim 1, wherein at least one of the silica particles of the mixed layer and at least one of the silica particles of the porous layer are joined to each other via the binder.

9. A member comprising:
a resin base material consisting of a resin;
a mixed layer on the resin base material, the mixed layer comprising the resin and a portion of a plurality of silica particles; and
a porous layer on the mixed layer, the porous layer having voids and comprising a binder and another portion of a plurality of a silica particles joined to each other by the binder,
wherein at least one silica particle of plurality of the silica particles joined to each other by the binder in the porous layer is partially embedded into the mixed layer where the plurality of the silica particles from the porous layer enters the mixed layer.

10. The member according to claim 9, wherein the thickness of the mixed layer is 20 nm to 160 nm.

11. The member according to claim 9, wherein a thickness variation of the mixed layer in a range having a length of 1 μm of a section of the mixed layer along an interface between the resin base material and the mixed layer is 15% or less.

12. The member according to claim 9, wherein a thickness of the porous layer is 100 nm to 800 nm.

13. The member according to claim 9, wherein at least one of the silica particles of the mixed layer and at least one of the silica particles of the porous layer are joined to each other via the binder.

14. The member according to claim 9, wherein the resin is selected from the group consisting of an acrylic resin, a polycarbonate, and a polyester.

15. The member according to claim 9, wherein an average Feret diameter of the plurality of the silica particles in the mixed layer is 10 nm to 60 nm.

16. The member according to claim 9, wherein the binder is a silica binder.

17. An image pickup apparatus comprising;
a housing;
the member according to claim 1;
an optical system; and
an image sensor configured to acquire a video through the optical system,
wherein the optical system and the image sensor are arranged in a space surrounded by the housing and the member.

18. An image pickup apparatus comprising;
a housing;
the member according to claim 9;
an optical system; and
an image sensor configured to acquire a video through the optical system,
wherein the optical system and the image sensor are arranged in a space surrounded by the housing and the member.

* * * * *